US008886638B2

(12) United States Patent  
Zhang et al.

(10) Patent No.: US 8,886,638 B2  
(45) Date of Patent: Nov. 11, 2014

(54) SYSTEM AND METHOD FOR RANKING SEARCH RESULTS WITHIN CITATION INTENSIVE DOCUMENT COLLECTIONS

(75) Inventors: Ling Qin Zhang, Springboro, OH (US); Harry R. Silver, Shaker Heights, OH (US)

(73) Assignee: LexisNexis, Miamisburg, OH (US)

( * ) Notice: Subject to any disclaimer, the term of this patent is extended or adjusted under 35 U.S.C. 154(b) by 0 days.

(21) Appl. No.: 13/403,253

(22) Filed: Feb. 23, 2012

(65) Prior Publication Data

US 2012/0215796 A1    Aug. 23, 2012

Related U.S. Application Data

(63) Continuation of application No. 12/385,668, filed on Apr. 15, 2009, now Pat. No. 8,150,831.

(51) Int. Cl.
*G06F 7/00* (2006.01)
*G06F 17/30* (2006.01)
*G06F 17/00* (2006.01)

(52) U.S. Cl.
CPC .... *G06F 17/30728* (2013.01); *G06F 17/30663* (2013.01); *Y10S 707/942* (2013.01)
USPC ............................ 707/723; 707/730; 707/942

(58) Field of Classification Search
USPC ................................. 707/708, 710, 723, 730
See application file for complete search history.

(56) References Cited

U.S. PATENT DOCUMENTS

| 7,269,587 | B1* | 9/2007 | Page ................................ 707/1 |
| 2006/0041608 | A1 | 2/2006 | Miller et al. |
| 2006/0059144 | A1 | 3/2006 | Canright et al. |
| 2006/0242564 | A1* | 10/2006 | Egger et al. .................. 715/513 |
| 2006/0248440 | A1 | 11/2006 | Rhoads et al. |
| 2007/0073748 | A1* | 3/2007 | Barney .......................... 707/101 |
| 2007/0266022 | A1* | 11/2007 | Frumkin et al. ................. 707/5 |
| 2008/0033929 | A1 | 2/2008 | Al-Kofahi et al. |
| 2008/0114753 | A1* | 5/2008 | Tal-Ezer .......................... 707/5 |
| 2008/0228752 | A1 | 9/2008 | Huang et al. |
| 2008/0229828 | A1 | 9/2008 | Buschman et al. |

OTHER PUBLICATIONS

Fowler et al., *The Authority of Supreme Court Precedent: A Network Analysis*; University of California, Davis, Jun. 29, 2005, pp. 1-36.
K. McGuire et al., *Precedent and Preferences on the U.S. Supreme Court*; 2005, 39 pages.

(Continued)

*Primary Examiner* — Kannan Shanmugasundaram
(74) *Attorney, Agent, or Firm* — Dinsmore & Shohl LLP

(57) ABSTRACT

Systems and methods facilitate a search and identify documents and associated metadata reflecting content of the documents. In one implementation, a method receives a query comprising a set of search terms, identifies a stored document in response to the query, and determines a score value for the retrieved document based on a similarity between one or more of the query search terms and metadata associated with the identified document. The method locates the identified document in a citation network of baseline query results, the citation network comprising a first set of documents that cite to the identified document and a second set of documents cited to by the identified document. The method further determines a new score value of the identified document as a function of the score value and a quantity and a quality of documents within the first and second set of documents.

10 Claims, 10 Drawing Sheets

(56) References Cited

OTHER PUBLICATIONS

Farahat et al., *Authority Rankings from Hits, Pagerank, and Salsa: Existence, Uniqueness, and Effect of Initialization*; 2005, 20 pages.
Balmin et al., *ObjectRank: Authority-Based Keyword Search in Databases*, Proceedings of the 30$^{th}$ VLBD Conference, Toronto, Canada, 2004, 12 pages.
Richardson et al., *The Intelligent Surfer: Probabilistic Combination of Link and Content Information in PageRank*, 2002, 8 pages.
Guo et al.;*XRANK: Ranked Keyword Search over XML Documents*; SIGMOD 2003, Jun. 9-12, 2003, San Diego, CA, 12 pages.
T. A. Smith, *The Web of Law*; Draft Sep. 10, 2005; 39 pages.
Brin et al., *The Anatomy of a Large-Scale Hypertextual Web Search Engine*; 1998, 20 pages.
Upstill et al., *Predicting Fame and Fortune: PageRank or Indegree?*, Proceedings of the i$^{th}$ Australasian Document Computing Symposium, Canberra, Australia, Dec. 15, 2003., 10 pages.
Agarwal et al., *Learning to Rank Networked Entities*; KDD'06, Aug. 20-23, 2006, Philadelphia, PA, USA., Copyright 2006 ACM 1-59593-339-5/06/0008., pp. 14-23.
Xing et al., *Weighted PageRank Algorithm; Proceeding of the 2$^{nd}$ Annual Conference on Communication Networks & Services Research (CNSR 2004)*, Fredericton, Canada, 10 pages.
Padmanabhan et al., *WICER: A Weighted Inter-Cluster Edge Ranking for Clustered Graphs*, Sep. 2005, 7 pages.
T.H. Haveliwala, *Topic-Sensitive PageRank*; WWW2002, May 7-11, 2002, Honolulu, Hawaii, USA., ACM 1-58113-449-5/02/0005, 10 pages.
Jeh et al., *Scaling Personalized Web Search*; 2003, pp. 1-24.
Page et al., *The PageRank Citation Ranking: Bringing Order to the Web*; Jan. 29, 1998, pp. 1-17.
Bharat et al., *When Experts Agree: Using Non-Affiliated Experts to Rank Popular Topics*; WWW10, May 1-5, 2001, Hong Kong. ACM 1-58113-348-0/01/0005, pp. 597-602.
Gibson et al., *Inferring Web Communities from Link Topology*, 1998, 10 pages.
J.M. Kleinberg, *Authoritative Sources in a Hyperlinked Environment*, 1999, 34 pages.
Lehmann et al., *Citation Networks in High Energy Physics*; The American Physical Society, Physical Review Edition 68, 026113 (2003) 8 pages.
H.F. Moed, *Citation Analysis of Scientific Journals and Journal Impact Measures*; Current Science, vol. 89, No. 12, Dec. 25, 2005, 7 pages.
Spriggs et al., *Explaining the Overruling of U.S. Supreme Court Precedent*; 2002, 45 pages.
Parker et al., *Use of the Normalized Word Vector Approach in Document Classification for an LKMC*; 2008, 12 pages.
*Natural Language (the Freesytle feature)—Description*; retrieved from http://support.lexis-nexis.com/online on Apr. 14, 2009, 2 pages.
PreCYdent; retrieved from http://precydent.com on Apr. 14, 2009, 3 pages.
PCT International Search Report, and PCT Written Opinion issued by the U.S. Patent & Trademark Office on Jun. 1, 2010, for PCT Application No. PCT/US 10/029168 (14 pages).
Communication and Supplementary European Search Report for European Patent Application No. 10764845.3, dated Sep. 21, 2012, 12 pages.
Bichteler, J. et al., "The Combined Use of Bibliographic Coupling and Cocitation for Document Retrieval," Journal of the American Society for Information Science, American Society for Information, vol. 31, No. 4, Jul. 1980, pp. 278-282.
Examination Report for New Zealand Patent Application No. 595709, dated Oct. 2, 2012, 2 pages.

\* cited by examiner

SYSTEM AND METHOD FOR RANKING SEARCH RESULTS WITHIN CITATION INTENSIVE DOCUMENT COLLECTIONS

RELATED APPLICATION(S)

This application claims the benefit of priority from and is a continuation of U.S. application Ser. No. 12/385,668 filed on Apr. 15, 2009 now U.S. Pat. No. 8,150,831, the contents of which are hereby incorporated by reference in its entirety.

TECHNICAL FIELD

Systems and methods consistent with disclosed embodiments display and rank a set of retrieved documents in response to a query.

BACKGROUND INFORMATION

Conventional search tools return a list of documents in response to a search query. The documents from the list may be ranked according to their relevance to the search query. For example, highly relevant documents may be ranked higher than, and may be displayed in a list above, documents of a lesser relevance. This allows a user to quickly and conveniently identify the most relevant documents retrieved in response to the query.

Some conventional search tools allow a user to perform a query using natural language. For example, LexisNexis® uses Freestyle™ to enable users to submit query terms associated with a case or legal concept. The search tool then returns a ranked list of legal documents matching the query terms. The search tool may rank the legal documents based upon a number of times the query terms appear in the legal document. For example, a term "patent" may occur in a first document 50 times, and may occur in a second, similarly sized document, 10 times. If the user entered a query for "patent," the search tool would deem the first document to be more relevant than the second document because it includes the term "patent" more times. In this instance, frequency and size are used to determine ranking. Therefore, the search tool would assign the first document a higher ranking than the second document.

With more complex queries, search tools may use word vectors when comparing a query with a document. Generally, a vector can be represented as a line segment with a direction and a magnitude. In a two-dimensional space, a two dimensional vector $V=[x, y]$ can be graphed with a start point at the origin (0,0) of the graph and an endpoint at a coordinate (x,y) of the graph. A similarity between any two vectors in the two dimensional space can be determined by calculating the cosine of the angle $\theta$ between the two vectors.

However, vectors can theoretically be defined across any number of dimensions n, such that $V=[x, y, \ldots n]$. While it is not possible to graphically model vectors over 3 dimensions, it is still possible to perform mathematical operations on these multidimensional vectors. For example, it is possible to determine an angle $\theta$ between two vectors that are defined over 3 dimensions, and to determine the similarity between those two vectors by calculating the cosine of the angle $\theta$.

Word vectors can be used to model any string of words, such as a document or a natural language query. The vectors can be defined according to a number of concepts in the English language. For example, if a modern thesaurus includes 1000 concepts, then each word vector would include 1000 dimensions. In other words, $V=[x, y, \ldots n]$ where n=1000. Each dimension in the vector would correspond to a unique one of the 1000 concepts, and a number in any particular dimension of the vector is the number of times that the concept corresponding to that dimension occurred in the query or document.

The following example shows a comparison between a document and a query using word vectors. The concepts from this example can also apply to a comparison between any two sets of words, such as between two documents. Table 1 illustrates an exemplary set of concepts along with words related to each concept.

TABLE 1

| Concept Definitions | |
| --- | --- |
| Concept No. | Words |
| 1 | the, a |
| 2 | attractive, nice, beautiful |
| 3 | rose, carnation, pansy |
| 4 | white, pink, purple |

Table 2 illustrates an exemplary set of word strings, along with words included in each word string.

TABLE 2

| Documents | |
| --- | --- |
| Word String. | Text |
| Document | the nice, attractive white rose |
| Query | the beautiful carnation |

Table 3 illustrates a vectorization of the document and the query from Table 2 using the concepts from Table 1.

TABLE 3

| Vectorization | | |
| --- | --- | --- |
| Word String | Vector | Categorization |
| Document | [1, 2, 1, 1] | [the; nice, attractive; rose; white] |
| Query | [1, 1, 1, 0] | [the; beautiful; carnation; null] |

The dimensions from the vectors in Table 3 correspond to the concepts set forth in Table 1, such that dimension 1 of each vector corresponds to concept 1, dimension 2 corresponds to concept 2, and so on. Accordingly, the document includes one term from concept 1 ("the"), and so a "1" is assigned to dimension 1 of its vector. The document includes two terms from concept 2 ("nice" and "attractive"), and so a "2" is assigned to dimension 2 of its vector. The remaining dimensions in the document vector, as well as the dimensions for the query vector, are filled in this manner.

Once the document vector and query vector are calculated in this example, it is possible to mathematically determine the angle $\theta$ between them. Therefore, it is also possible to determine the similarity between the query and the document by calculating the cosine of the angle $\theta$ between their respective word vectors. This similarity value can be compared with the similarity value of the same query with a different document. In this way, the search tool may rank the documents depending on their similarity with respect to the query. Phrase vectors may also be used in addition to, or instead of word vectors.

This technique may not be the best indicator of relevance. For one thing, it relies fundamentally on the frequency of terms within a particular class. It also ignores other factors that may be important in determining relevance and ranking.

Accordingly, there is a need to improve the ranking of search results in response to a query.

SUMMARY

In accordance with one embodiment, there is provided a computer implemented method for facilitating a search and identification of documents and associated metadata reflecting content of the documents stored in a memory device. The method involves receiving a query comprising a set of search terms, identifying a stored document in response to the query, determining a score value for the retrieved document based on a similarity between one or more of the query search terms and metadata associated with the identified document, and locating the identified document in a citation network of baseline query results. The citation network may include a first set of documents that cite to the identified document and a second set of documents cited to by the identified document. The method further involves determining a new score value of the identified document as a function of the score value and a quantity and a quality of documents within the first and second set of documents, ranking the identified document based on the new score value, and outputting on a display device, a report reflecting the ranking of the identified document.

In accordance with another embodiment, there is provided a computer-readable medium comprising program instructions, which, when executed by a processor, cause the processor to perform a method for facilitating a search and identification of documents and associated metadata reflecting content of the documents stored in a memory device. The method involves receiving a query comprising a set of search terms, identifying a stored document in response to the query, determining a score value for the identified document based on a similarity between one or more of the query search terms and metadata associated with the identified document, and locating the identified document in a citation network of baseline query results. The citation network may include a first set of documents that cite to the identified document and a second set of documents cited to by the identified document. The method further involves determining a new score value of the identified document as a function of the score value and a quantity and a quality of documents within the first and second set of documents, ranking the identified document based on the new score value, and outputting on a display device, a report reflecting the ranking of the identified document.

In accordance with another embodiment, there is provided a computer system, including memory and at least one processor for facilitating a search and identification of documents and associated metadata reflecting content of the documents stored in a memory device. The system includes a processor receiving a query comprising a set of search terms, and identifying a stored document in response to the query. The system also includes an IR score generating component determining a score value for the identified document based on a similarity between one or more of the query search terms and metadata associated with the identified document. The system also includes a citation network of baseline query results comprising a first set of documents that cite to the identified document and a second set of documents cited to by the identified document. The system also includes a citation component locating the identified document in the citation network, and determining a new score value of the identified document as a function of the score value and a quantity and a quality of documents within the first and second set of documents. The system also includes a display device displaying a report reflecting a ranking the identified document based on the new score value.

In accordance with yet another embodiment, there is provided a computerized method for calculating an activity score value to rank an identified document. The method involves identifying a stored document, determining a number of times the identified document was cited in a subject matter community of the identified document, determining a probability distribution that individual documents within the subject matter community are cited a variable number of times by other individual documents in the subject matter community, calculating the activity score value according to a probability that the individual documents in the subject matter community are cited at least the number of times the identified document was cited in the subject matter community, and storing in computer memory a report reflecting a ranking of the identified document based on the activity score value.

In accordance with still yet another embodiment, there is provided a computer-readable medium comprising program instructions, which, when executed by a processor, cause the processor to perform a method for calculating an activity score value to rank an identified document. The method involves, identifying a stored document, determining a number of times the identified document was cited in a subject matter community of the identified document, determining a probability distribution that individual documents within the subject matter community are cited a variable number of times by other individual documents in the subject matter community, calculating the activity score value according to a probability that the individual documents in the subject matter community are cited at least the number of times the identified document was cited in the subject matter community, and storing in computer memory a report reflecting a ranking of the identified ranking based on the activity score value.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various disclosed embodiments. In the drawings.

DETAILED DESCRIPTION

Disclosed systems and methods may facilitate a search and identify documents and associated metadata reflecting the content of the documents. For example, disclosed embodiments may rank search results within citation intensive document collections. To do so, disclosed embodiments may identify a stored document in response to a query and determine a score value for the document based on a similarity between one or more of query search terms and metadata associated with the document. Disclosed embodiments may further locate the document in a citation network of baseline query results. For example, the citation network may include a first set of documents that cite to the document and a second set of documents that are cited to by the identified document. Disclosed embodiments may determine a new score value for the document as a function of the score value and a quantity and a quality of documents within the first and second set of documents.

Reference will now be made in detail to disclosed embodiments, examples of which are illustrated in the accompanying drawings. Wherever possible, the same reference numbers will be used throughout the drawings to refer to the same or like parts.

Figure 1:
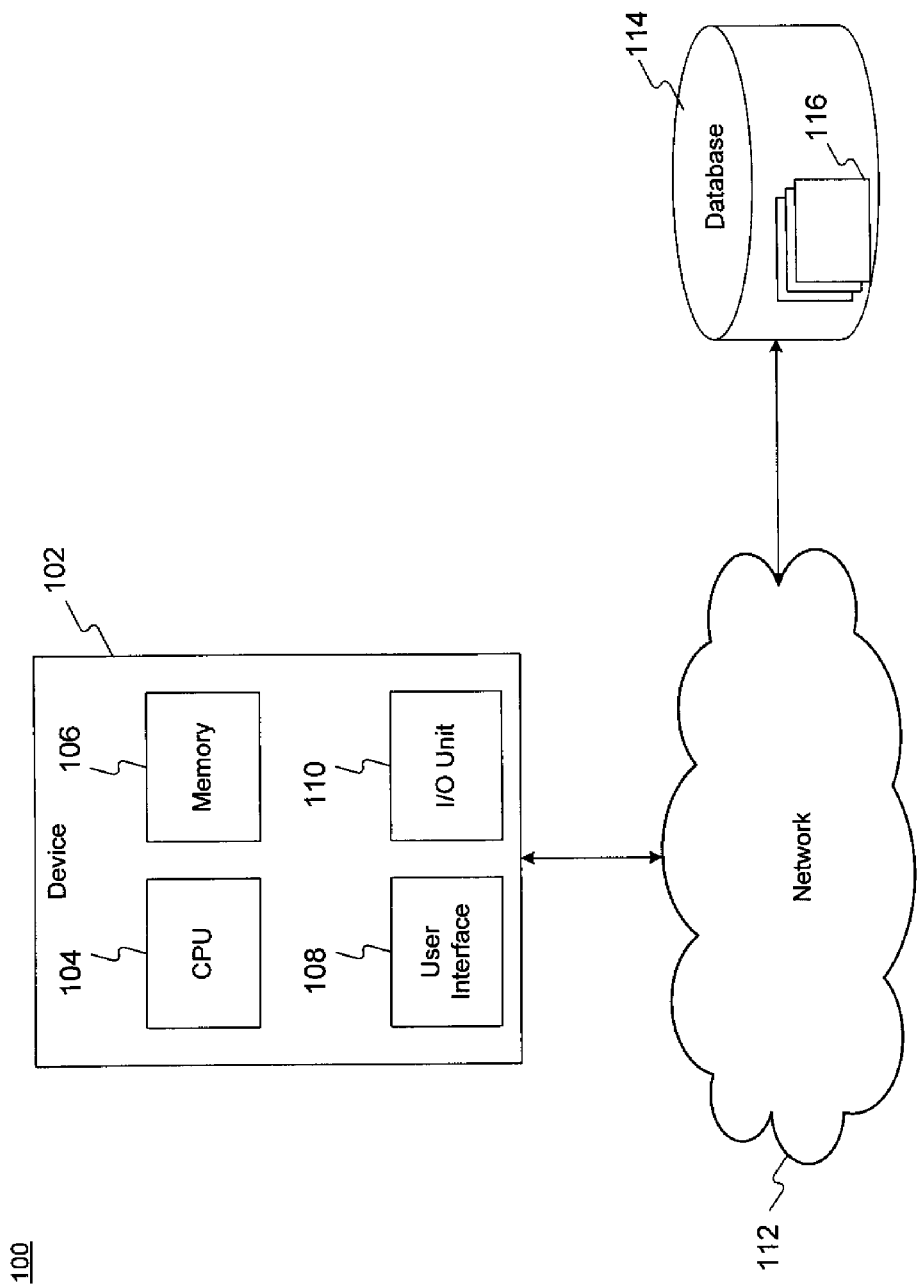
FIG. 1 includes a block diagram of system components for ranking search results in accordance with one embodiment.

FIG. 1 is an exemplary system 100, consistent with a disclosed embodiment. Although a specific number of components are depicted in FIG. 1, any number of these components may be provided. Furthermore, the functions provided by one or more components of system 100 may be combined or separated. Moreover, the functionality of any one or more components of system 100 may be implemented by any appropriate computing environment.

With reference to FIG. 1, system 100 may include device 102, network 112, and database 114. Device 102 may be used for performing computing tasks, such as legal research and other types of research. For example, device 102 may be a desktop computer, laptop computer, or other mobile device. Device 102 may include central processing unit (CPU) 104, memory 106, user interface 108, and/or I/O unit 110.

CPU 104 may execute computer program instructions to perform various processes and methods. CPU 104 may read the computer program instructions from memory 106 or from any computer-readable medium. Memory 106 may include random access memory (RAM) and/or read only memory (ROM) configured to access and store information and computer program instructions. Memory 106 may also include additional memory to store data and information, and/or one or more internal databases (not shown) to store tables, lists, or other data structures. Moreover, user interface 108 may access user data, such as a user supplied query. In some embodiments, user interface 108 may be separate from device 102. User interface 108 may also include a visual display. Furthermore, I/O unit 110 may access data over network 112.

Network 112 in system 100 may facilitate communications between the various devices in system 100, such as device 102 and database 114. In addition, device 102 may access legacy systems (not shown) via network 112, or may directly access legacy systems, databases, or other network applications. Network 112 may be a shared, public, or private network, may encompass a wide area or local area, and may be implemented through any suitable combination of wired and/or wireless communication networks. Furthermore, network 112 may comprise a local area network (LAN), a wide area network (WAN), an intranet, or the Internet.

Database 114 in system 100 may include an organized set of documents 116 and/or information about documents 116. Documents may be associated with any subject matter, such as legal, scientific, financial, and/or political. Information about documents 116 may include data about the documents (e.g., metadata), for example, data from a Shepard's® database, which is applicable to legal documents. Moreover, data about the documents (e.g., metadata) may be included within the documents themselves. For example, for legal cases, the metadata may include a listing of core terms and headnotes. The listing of core terms may capture the content of the document. Moreover, the headnotes may be descriptive text blocks located with the document. Headnotes may briefly summarize the content of the baseline document. The headnotes may include headnotes from LexisNexis®. The documents 116 may pertain to any subject and, accordingly, information about documents 116 may pertain to or relate to information that is associated with the documents 116.

Moreover, although shown as separate components in FIG. 1, database 114 and device 102 may be combined. For example, device 102 may include one or more databases in addition to or instead of database 114. Database 114 may also be distributed over multiple databases.

Figure 2:
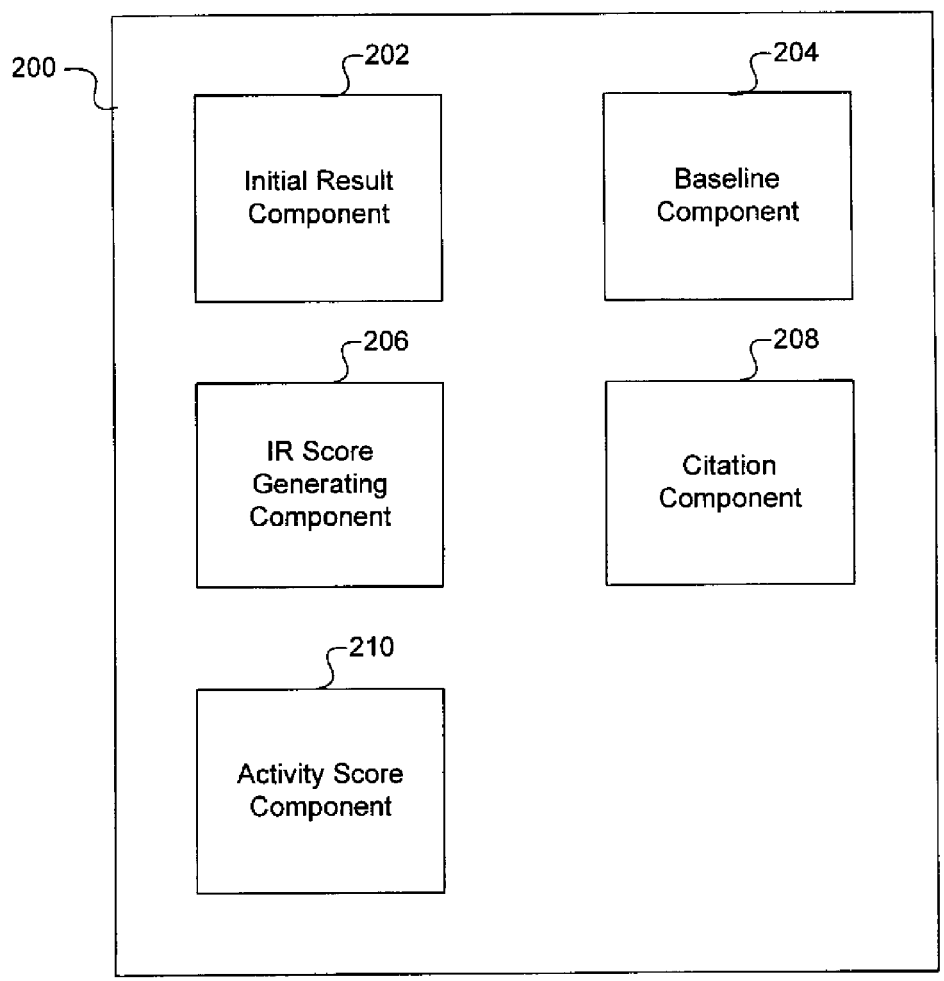
FIG. 2 includes a block diagram of components that may be used in ranking search results in accordance with one embodiment.

FIG. 2 shows memory 200, which may include components used for ranking search results. Memory 200 may be similar to memory 106 from FIG. 1. Memory 200 may include initial result component 202, baseline component 204, IR (information retrieval) score generating component 206, citation component 208, and activity score component 210. These components may be implemented in hardware, software, or firmware, or a combination.

Initial result component 202 may calculate an initial result set of initial documents in response to a query. The initial result set may be a list of the initial documents that represents a first cut at identifying documents satisfying the query. However, in some cases, the initial result set may not include important documents that are relevant to the query. In these situations, the initial result may be augmented to include additional documents.

Baseline component 204 may augment the initial result set to include additional documents that are relevant to the query. In particular, baseline component 204 may determine additional documents that are frequently cited by the initial documents from the initial result set. These additional documents may be added to the initial result set to create a baseline result. Baseline documents may be documents within the baseline result. The baseline documents may include the initial documents and the additional documents. Alternatively, the baseline documents may include only the initial documents without any additional documents. After the baseline documents are identified, they may then be ranked according to their relevance with respect to the query.

IR score generating component 206 may retrieve metadata from within the baseline documents themselves (e.g., within database 114). The metadata may describe the baseline documents, for example by including core terms and/or head notes. IR score generating component 206 may compare the metadata of the baseline document to the query. Accordingly, IR score generating component 206 may also generate an IR score for the baseline documents using the metadata. The IR score may represent a similarity between the baseline documents and the query.

Citation component 208 may weight an IR score of a particular baseline document according to citations from other baseline documents (i.e., in-cites) and/or citations to other baseline documents (i.e., out-cites). Activity score component 210 may generate an activity score to further weight the IR scores according to how well-known the scored case is within the legal community as a whole. Alternatively, the activity score may not weight the IR score, and may be used independently from the IR score.

Figure 3:
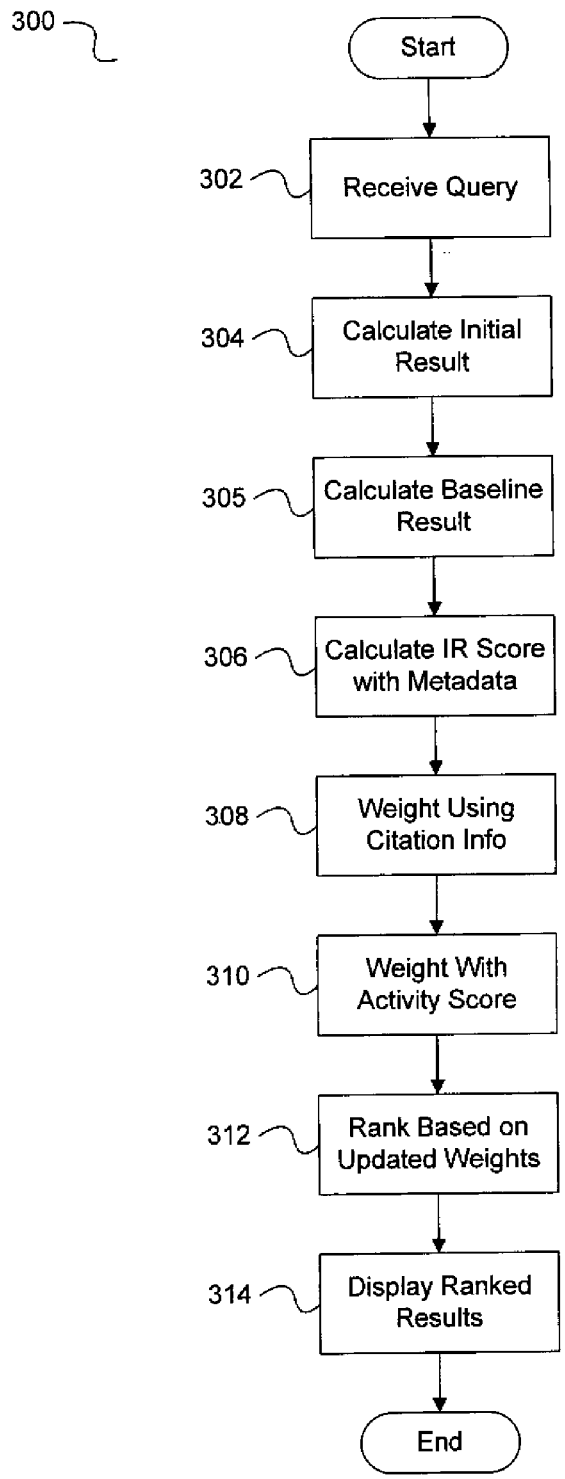
FIG. 3 includes a flow diagram illustrating a ranking of search results in accordance with one embodiment.

FIG. 3 illustrates the operations of an exemplary method 300 for ranking search results. Method 300 may be executed by CPU 104, alone or in conjunction with other components. In block 302, CPU 104 may receive a query, for example, a search query for documents. The query may be received from a user via user interface 108 or may be automatically generated. In block 304, CPU 104 may execute initial result component 202 to calculate an initial result set of the query, for example, by identifying a list of initial documents that are generally relevant to the query. The initial documents may be identified according to a frequency with which query terms occur within the initial documents, the proximity with which query terms occur within the initial documents, and/or other factors. The initial documents may reside in database 114 and may be associated with documents 116.

In block 305, CPU 104 may execute baseline component 204 to calculate a baseline result with baseline documents. The baseline documents may include the initial result documents and additional documents. The additional documents may be documents that are relevant to the query, but are not included with the initial result set. The additional documents may be documents that are frequently cited by the initial documents. Moreover, the additional documents may be documents that are cited, more than a threshold number of times, by the initial documents.

In block 306, CPU 104 may execute IR score generating component 206 to calculate an information retrieval (IR) score for each of the baseline documents using metadata. As discussed, the metadata may include data describing the baseline documents, and may be located within the baseline documents themselves and/or in database 114. Specifically, metadata from each of the baseline documents may be compared with the query to calculate the IR score. Accordingly, the IR score may represent a similarity between each of the baseline documents and the query.

In block 308, CPU 104 may execute citation component 208 to weigh the IR score of the baseline documents using citation information. An IR score for a baseline document may be increased if it is cited by other baseline documents (i.e., in-cites) and/or if it cites to other baseline documents (i.e., out-cites).

In block 310, CPU 104 may execute activity score component 210 to weigh the IR score of the baseline documents using an activity score. An IR score for a baseline document may be increased if it is famous and well known in the legal community as a whole. Alternatively, the activity score may not be used to weight the IR score, and may be used independently from the IR score.

In block 312, CPU 104 may rank the baseline documents according to weighted IR scores. Alternatively, or in addition, CPU 104 may rank the baseline documents according to the activity score. In block 314, CPU 104 may cause the baseline documents to be displayed in accordance with their rank. For example, higher ranked baseline documents may be displayed higher on a list than lower ranked baseline documents.

One of ordinary skill will recognize that any blocks 302-314 may be omitted and/or executed in any order.

Figure 4:
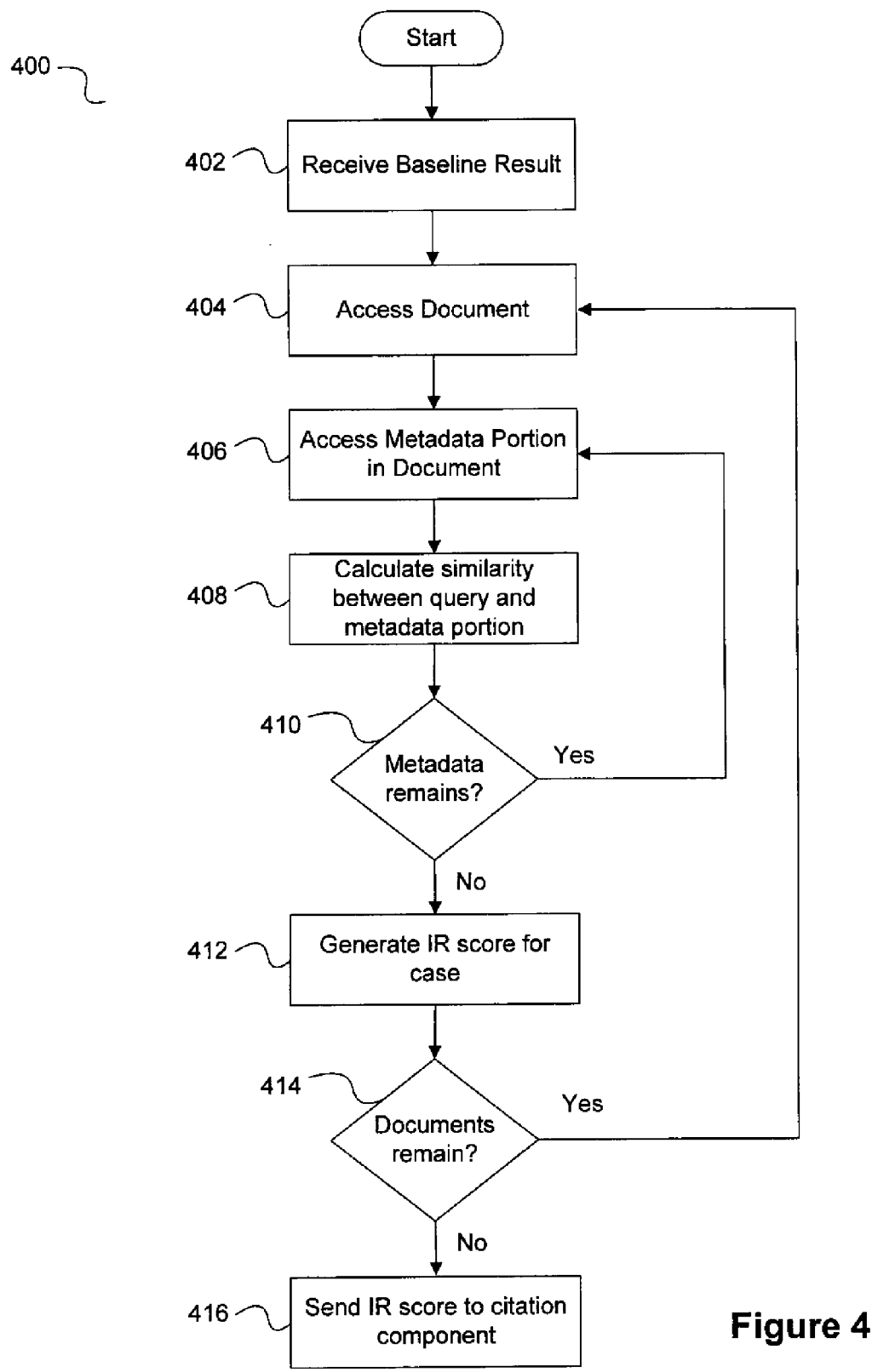
FIG. 4 includes a flow diagram illustrating a calculation of an IR score using metadata in accordance with one embodiment.

FIG. 4 is a flow diagram 400 of the operations involved in calculating an information retrieval (IR) score using metadata. In accordance with one implementation consistent with a disclosed embodiment, flow diagram 400 may be a process implemented by an IR score generating component 206.

In block 402, IR score generating component 206 may receive a baseline result, for example, from baseline component 204. As discussed, the baseline result may identify baseline documents that are relevant to or that meet a query. A baseline document within the baseline result may be located in database 114. Moreover, the baseline document may include metadata portions that describe contents of the baseline document. The metadata portions may include a listing of core terms and headnotes. The listing of core terms may capture the content of the baseline document. Moreover, the headnotes may be descriptive text blocks located with the baseline document. Headnotes may briefly summarize the content of the baseline document. The headnotes may include headnotes from LexisNexis®.

In block 404, IR score generating component 206 may access a baseline document in the baseline result, for example, from database 114. In block 406, IR score generating component 206 may access a metadata portion located within the accessed baseline document. The metadata portion may include the core terms or may include the headnotes.

In block 408, IR score generating component 206 may calculate a similarity between the query and the accessed metadata portion. For example, a similarity may be calculated between the query and the core terms of the metadata and/or between the query and the headnotes of the metadata.

If calculating a similarity between the query and the headnotes, suppose q represents a word vector from the query and H represents a word vector from the headnotes. In this case, $$\text{similarity}(H,q)=|H|*\cos\theta \quad \text{[Equation 1]}$$

where θ is the angle between the word vectors H and q. In other words, the similarity between the word vector q (for the query) and the word vector H (for the headnotes) equals the magnitude of the word vector H, multiplied by the cosine of the angle θ between q and H.

Alternatively, or in addition, if calculating a similarity between the query and the core terms, suppose q still represents the word vector from the query and T represents a word vector from core terms. In this case, $$\text{similarity}(T,q)=|T|*\cos\tau \quad \text{[Equation 2]}$$

where τ is the angle between the word vectors T and q. In other words the, similarity between the word vector q (for the query) and the word vector T (for the core terms) equals the magnitude of the word vector T, multiplied by the cosine of the angle τ, between q and T.

As discussed, the metadata in the baseline document may include both headnotes and core terms. In some embodiments, IR score generating component 206 may retrieve and process the headnotes and core terms separately. Accordingly, after the similarity data is calculated for either the headnotes (according to Equation 1), the core terms (according to Equation 2), or both, IR score generating component 206 may determine, in block 410, whether any metadata remains within the baseline document. If the headnotes were already processed, then core terms may remain. Alternatively, if the core terms were already processed, then the headnotes may remain.

If metadata from the baseline document remains un-retrieved and unprocessed (410-Yes), then process returns to block 406 to retrieve and process the remaining metadata. If no metadata from the baseline document remains un-retrieved and unprocessed (410—No), then all metadata has been considered, and in block 412, IR score generating component 206 may generate the IR score for the baseline document according to the processing of the headnotes (according to Equation 1) and core terms (according to Equation 2) from the metadata.

For example, suppose similarity data for the core terms and the headnotes, with respect to the query, are calculated according to Equation 1 and Equation 2 above. IR score generating component 206 may then add and weight these values to generate the IR score for a particular baseline document. For example, for a document d that includes the core terms and headnotes, $$IRScore(d,q) w1*similarity(H,q)+w2*similarity(T,q) \quad \text{[Equation 3]}$$

where w1 and w2 are parameter variables to weight the similarity data, and may be determined experimentally. Thus, the IR score of document d, with respect to query q, equals the similarity between the headnotes of the document and the query on the one hand (Equation 1), added to the similarity between the core terms of the document and the query (Equation 2) on the other hand.

Next, in block 414, IR score generating component 202 may determine whether any baseline documents from the baseline result remain unscored by IR score generating component 206. If baseline documents from the baseline result remain unscored (414-Yes), then process returns to block 404 to process the remaining baseline documents. If no baseline documents from the baseline result remain unscored (414—No), then all baseline documents have been considered and scored by IR score generating component 206. Accordingly, in block 414, IR score generating component 206 may send the IR score(s) to citation component 208. One of ordinary skill will recognize that any blocks 402-416 may be omitted and/or executed in any order.

Figure 5:
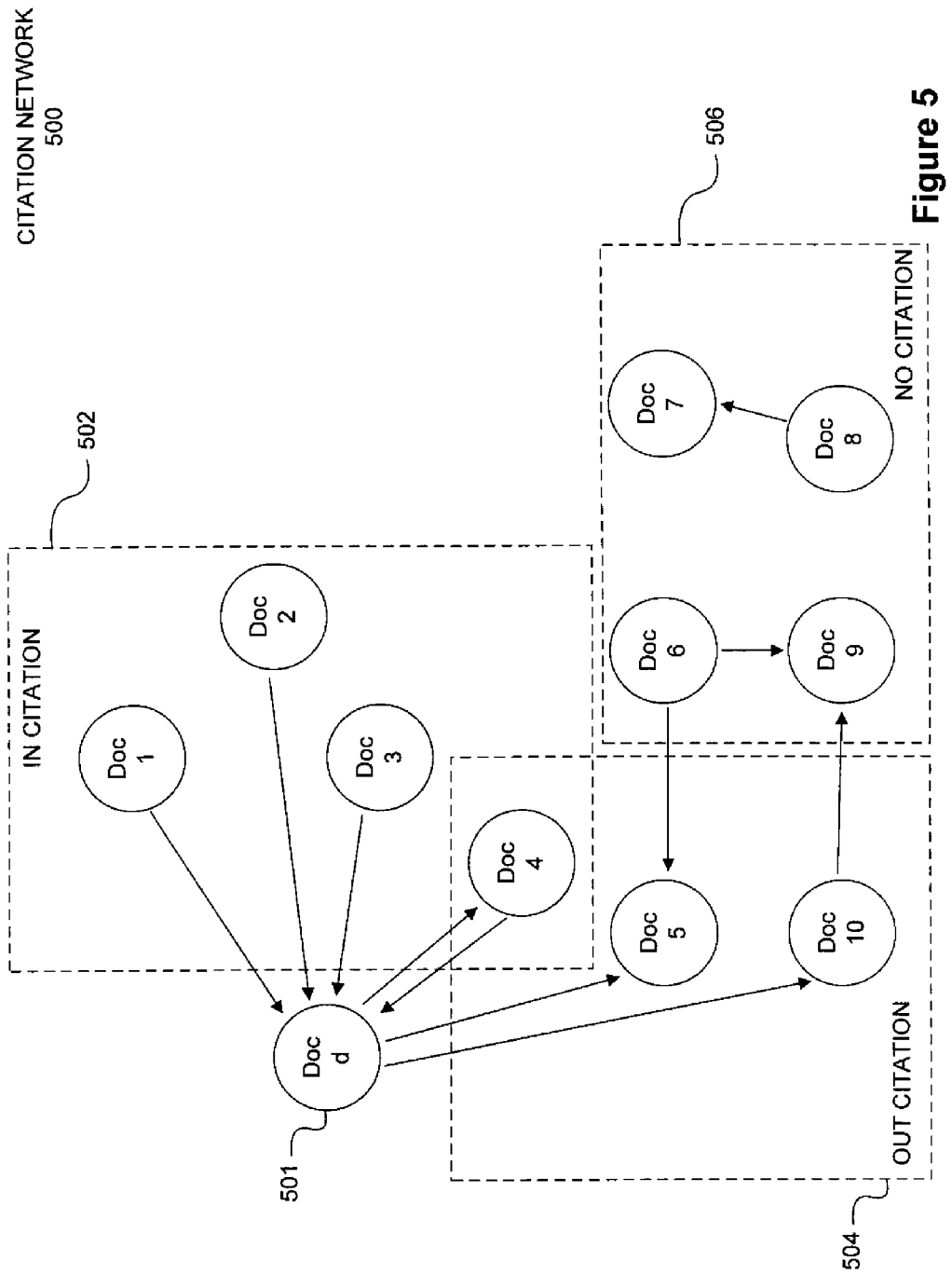
FIG. 5 includes a citation network illustrating citation relationships among baseline documents in accordance with one embodiment.

FIG. 5 illustrates a citation network 500 including citation relationships among baseline documents, in accordance with one implementation consistent with a disclosed embodiment. Citation network 500 may be stored in memory 106 and/or database 114. Citation network 500 may represent a relationship among documents, such as documents 116.

Citation network may include document d 501, in citation sub-network 502, out citation sub-network 504, no citation sub-network 506, and documents 1-10. In some embodiments, citation network 500 may include only the baseline documents from the baseline results that are retrieved in response to a query.

Document d 501 may be a particular baseline document from the baseline results. In citation sub-network 502 may include baseline documents that include a citation or reference to document d 501. Specifically, baseline documents 1, 2, 3, and 4 within in citation sub-network 502 cite to document d 501, as indicated by the arrows pointing from baseline documents 1, 2, 3, and 4 to document d 501. Thus, each of documents 1, 2, 3, 4 include a reference to d 501.

Moreover, out citation sub-network 504 may include baseline documents that are cited to by document d 501. Specifically, baseline documents 4, 5, and 10, within out citation sub-network 504 are cited by d 501, as indicated by the arrows pointing from document d 501 to baseline documents 4, 5, and 10. Thus, d 501 includes a references to each of documents 4, 5, and 10.

Furthermore, no citation sub-network 504 may include baseline documents that have no direct relationship to document d 501. Specifically, baseline documents 6, 7, 8, and 9 within no citation sub-network 506 have no direct citation relationship with d 501, and thus, do not have any arrows showing a relationship directly to document d 501. Thus, none of documents 6, 7, 8, and 9 include a reference to d 501, nor does d 501 include a reference to any of documents 6, 7, 8, and 9.

As discussed, baseline documents represent a first cut of retrieving relevant documents that are responsive to a query. To that end, a "meta rank score" takes into account citation relationships among the baseline documents to rank the baseline documents according to their relevancy with respect to the query. For example, baseline documents that have a large number of relationships with other baseline documents may be particularly relevant to the query. The citation relationships used to calculate the meta rank score may be similar to those discussed in connection with FIG. 5.

Figure 6:
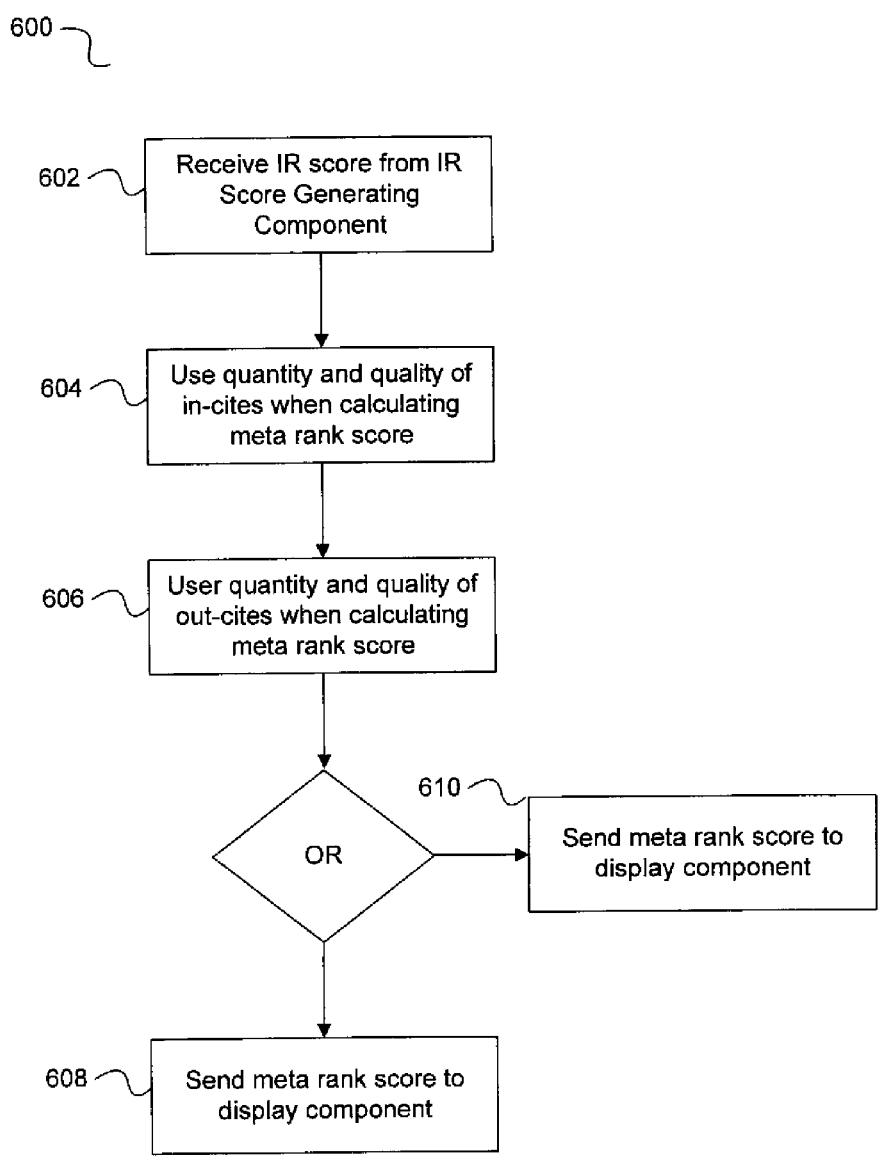
FIG. 6 includes a flow diagram illustrating a weighting of an IR score using citations in accordance with one embodiment.

FIG. 6 includes a flow diagram 600 illustrating a use of citation relationships for calculating the meta rank score. Flow diagram 600 may be a process implemented by citation component 208. Citation component 208 may use citation relationships specified in citation network 500 to calculate the meta rank score.

In block 602, citation component 208 may receive an IR score for a document d, for example, from IR score generating component 206. As discussed, the IR score generating component 206 may have calculated the IR score according to metadata (including headnotes and core terms). The IR score may now be used to calculate document d's meta rank score in combination with the citation relationships among baseline documents. As discussed, the meta rank score may be an accurate indication of d's relevance to the query because it takes into account citation relationships between d and other baseline documents that were returned as baseline results to the query.

Citation component 208 may use in-cites and out-cites in calculating the meta rank score for document d. In-cites may relate to baseline documents that cite to document d. For example, in-cites were discussed in connection with in citation sub-network 502 from FIG. 5. Furthermore out-cites may relate to baseline documents that document d cites to. For example, out-cites were discussed in connection with out citation sub-network 504 from FIG. 5.

In block 604, citation component 208 may calculate the meta rank score using in-cites to d. Thus, the documents from in-citation network 502 may be used to calculate d's meta rank score. For example, d's meta rank score may depend on a number of baseline documents that cite to d. The meta rank score may equal the IR score for d (e.g. as previously calculated in equation 3), plus an added amount for each baseline document that cites to d. Moreover, the relevance of the baseline documents that cite to d may be also considered when calculating the meta rank score for d. For example, $$metaRankScoreIn(d) = IRScore(d, q) + \sum_{t \in C(d)} \log_2(IRScore(c, q)) \quad \text{[Equation 4]}$$

for C(d), a set of legal documents c that cite to d, for example baseline documents within in citation sub-network 502. In other words, a meta rank score for d is the IR score of d (the first term of Equation 4), plus the $\log_2$ of the IR score of each of the documents c that cite to d (the second term of Equation 4). In this way, the second term of Equation 4 takes into account not only the number of documents c that cite to d (by virtue of the summation), but also the quality of documents c. The quality of documents c is determined in Equation 4 according to the relevance of documents c to the query q (by virtue of their IR score in the second term of Equation 4).

Instead of using Equation 4 to calculate the meta rank score for in-cites, the following equation may alternatively be used, $$metaRankScoreIn(d) = \qquad \text{[Equation 5]}$$
$$IRScore(d, q) + \sum_{c \in C(d)} IRScore(c, q) * smetaSimilarity(c, d)$$

where new term smetaSimilarity(c,d) is a calculation directly comparing the headnotes of each of documents c with the headnotes from d, and also comparing the core terms of each of documents c, with the core terms from d. Moreover, smetaSimilarity(c,d) can be mathematically calculated by Jaccard measure as follows, $$smetaSimilarity(c, d) = \qquad \text{[Equation 6]}$$
$$w1 * \frac{|Core(c) \cap Core(d)|}{|Core(c) \cup Core(d)|} + w2 * \frac{|HN(c) \cap HN(d)|}{|HN(c) \cup HN(d)|}$$

where Core(c) and HN(c) are the set of core term and headnotes, respectively, for documents c, and Core(d) and HN(d) are the set of core term and headnotes, respectively, for d. In other words, an additional way of measuring the quality of documents c that cite to d, is to value the degree to which each document c is similar to d, by comparing the headnotes and core terms of each. Specifically the numerator of the first fraction of equation 6 is the number of core terms common to both document c and d (exemplified by the intersection operator ∩). The denominator of the first fraction of equation 6 is the total number of distinct core terms in document c and d (exemplified by the union operator ∪). Moreover, the numerator of the second fraction of equation 6 is the number of headnotes common to both document c and d (exemplified by the intersection operator ∩). The denominator of the second fraction of equation 6 is the total number of distinct headnotes in document c and d (exemplified by the union operator ∪). In this way, smetaSimilarity(c,d) may be calculated using the in-cites to d.

In addition to, or instead of, computing the meta rank score using in-cites as in block 604, out-cites can be used in computing the meta rank score. Thus, the documents from out-citation network 504 may be used to calculate d's meta rank score. Accordingly, in block 606, citation component 208 may calculate the meta rank score using out-cites from d. For example, d's meta rank score may depend on a number of baseline documents cited by d. The meta rank score may equal the IR score for d (e.g. as previously calculated in equation 3), plus an added amount for each baseline document cited by d. Moreover, the relevance of the baseline documents cited by d are also considered when calculating the meta rank score. For example, $$metaRankScoreOut(d) = \qquad \text{[Equation 7]}$$
$$IRScore(d, q) + \sum_{e \in E(d)} IRScore(e, q)^\alpha - \beta$$

for E(d), a set of legal documents e that are cited by d (for example baseline documents within out citation sub-network 504), and where α and β may be experimentally determined, and may be initially set as α=½ and β=0. In other words, a meta rank score for d is the IR score of d (the first term in Equation 7), plus the IR score of each of the documents e cited by d (the second term in Equation 7). As mentioned, the third term in Equation 7, β, may be experimentally determined. This way, the second term of Equation 7 takes into account not only the number of documents e cited by d, but also the quality of documents e. The quality of documents c is determined in Equation 7 according to the relevance of the documents e to the query q (by virtue of their IR score in the second term of Equation 7).

Instead of using Equation 7 to calculate the meta rank score for out-cites, the following equation may be used, $$metaRankScore(d)Out = \qquad \text{[Equation 8]}$$
$$IRScore(d, q) + \sum_{e \in E(d)} IRScore(e, q) * \sum_{t \in T(d)} \frac{IRScore(t, q)}{|T(d)|}$$

for T(d), a set of topics included in d. In other words, a meta rank score for d is the IR score of d, plus the IR score of each of the documents e cited by d, weighted by an IR score of the topical relevance of d. Moreover, IRScore(t,q) may be mathematically calculated by Jaccard measure as follows:

$$IRScore(t, q) = \frac{|Topic(t) \cap Term(q)|}{|Topic(t) \cup Term(q)|} \qquad \text{[Equation 9]}$$

where Topic(t) and Term(q) may be the set of topics t in d, and the set of terms in query q, respectively. In other words, the topical similarity between d and q, divided by the total number of topics in d (the last sum in equation 8) weights the IR score of each document e that is cited by d (the first sum in equation 8). Moreover, with respect to equation 9, the numerator is the total number of distinct topics that are included in both topic t of document d and query q (exemplified by the intersection operator ∩). The denominator is the total number of distinct terms that are included in topic t of document d or query q (exemplified by the union operator ∪). In this way, the meta rank score may be calculated using the out-cites from d.

After calculating the meta rank score using at least one of in-cites from 504 and out-cites from 506, in block 608, citation component 208 may send the meta rank for display. Alternatively, in block 610, citation component 208 may send the meta rank to activity score component 210 for further weighing. One of ordinary skill will recognize that any blocks 602-610 may be omitted and/or executed in any order.

Figure 7:
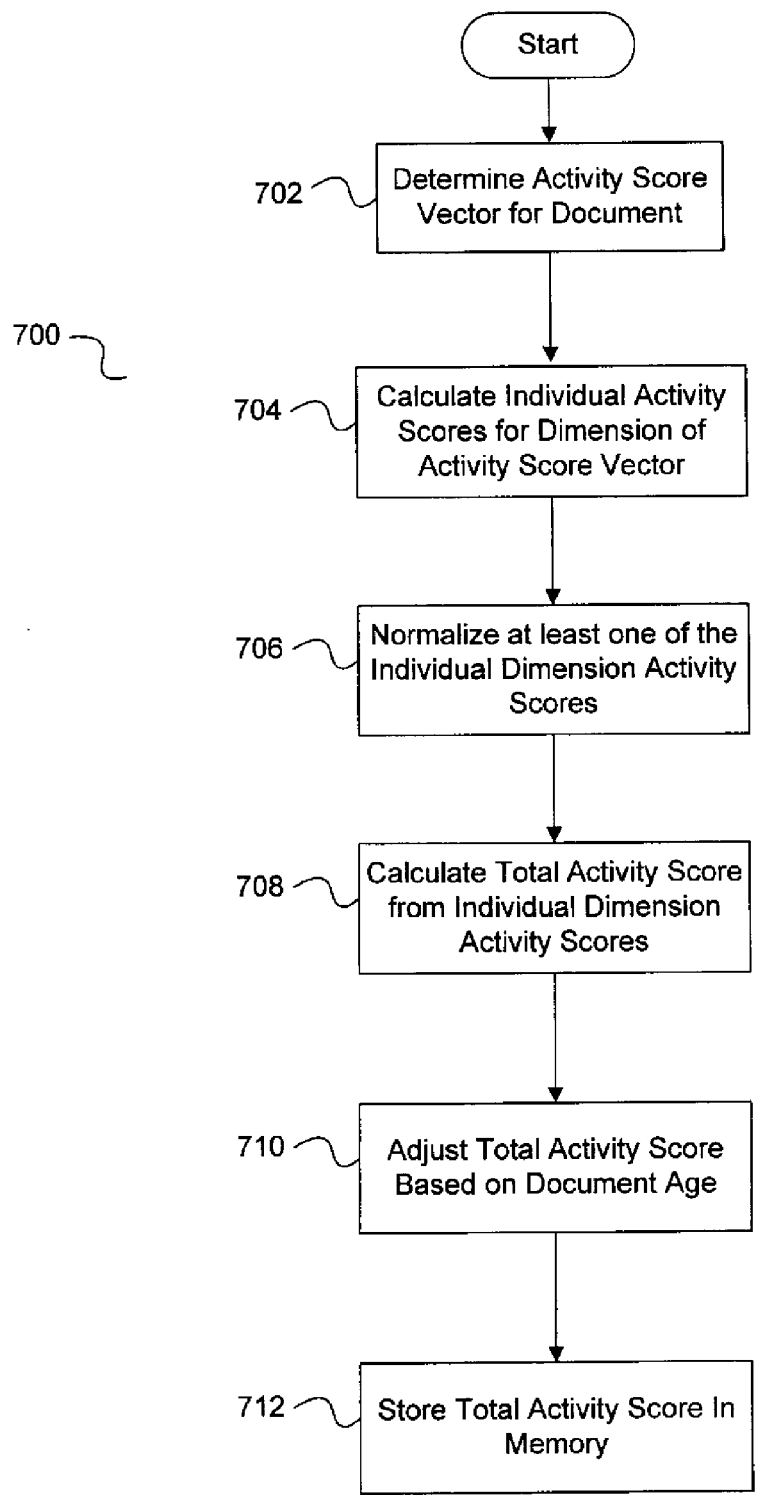
FIG. 7 includes a flow diagram illustrating an activity score calculation for a legal document in accordance with one embodiment.

FIG. 7 includes a flow diagram 700 illustrating an activity score calculation for a document, such as a legal document. An activity score may reflect the prominence of document d within its subject matter community as a whole, such as a legal community. Flow diagram 700 may be a process implemented by an activity score component 210 to calculate the activity score of a document d. The activity score component 210 may operate independently from a query or other search.

In block 702, activity score component 210 may determine an activity score vector for document d. The activity score vector may be used to model the manner in which outside sources have treated, commented on, or described document d. The activity score vector may be constructed according to six parameters of document d. Each parameter may correspond to a different outside source that has treated document d. The six parameters may include case cites, U.S. Supreme Court cites, law review articles, treatises, signal, and/or treatment. The activity score vector as a whole, and each of the parameters in particular, may provide an indication as to the overall prominence of d in the subject matter community.

For example, parameter one of the activity score, i.e., case cites, may relate to court cases in a particular subject matter community that cite to d. The subject matter community may include the legal community as a whole, and may not be limited to the baseline search results. In some embodiments, the subject matter community may be limited by a legal jurisdiction, such as a particular state, or may include multiple jurisdictions. A number of cases in the subject matter community that cite to d may be an indicator of the prominence of d within the subject matter community as a whole.

Parameter two of the exemplary activity score, i.e., U.S. Supreme Court cites, may include U.S. Supreme Court cases that cite to d. Because documents cited by the U.S. Supreme Court are considered strong precedent, any U.S. Supreme Court cases that cite d may be an indicator of the prominence of d.

Parameters three and four of the exemplary score vector, i.e., law review articles and treatises that cite to d, may be legal documents, which are not court cases, and that may indicate the academic treatment of d. Accordingly, law review articles and treatises that cite to d may also be an indicator of the prominence of d within the subject matter community.

Parameters five and six of the activity score, i.e., signal and treatment, may be retrieved from a Shepard's® database. The signal may summarize the treatment of d within the legal community. The treatment may include a number of positive and negative treatments of d within the subject matter community.

More or fewer parameters may be used for calculating the activity score. Moreover, the parameters disclosed herein are exemplary only.

Next, in block 704, activity score component 210 may calculate an individual activity score for each of the parameters of the activity score. For example, individual activity scores may be calculated for parameters one through four (case cites, U.S. Supreme Court cites, law review articles, treatises), which emphasis a number of documents, not limited to baseline documents, that cite to d. Moreover, individual activity scores may also be calculated for parameters five and six (i.e. signal and treatment).

In block 706, activity score component 210 may adjust or normalize at least one of the individual activity scores, for example those corresponding to parameters one through four, according to a probability. In block 708, activity score component 210 may calculate a total activity score by adding the adjusted or normalized individual activity scores from parameters one through six. In block 710, the activity score component 210 may adjust the total activity score according to the age of d. In block 712, the activity score component 210 may store the total activity score in memory. One of ordinary skill will recognize that any blocks 702-712 may be omitted and/or executed in any order.

Specifically, there are several ways to individually score parameters one through four as set forth in block 704. Parameters one through four emphasize a number of documents in a subject matter community as whole, not limited to baseline documents related to a query, that cite to document d. For example, an individual activity score for parameter one (representing case cites), may simply equal a number of times that documents within the subject matter community cite to d.

Figure 8:
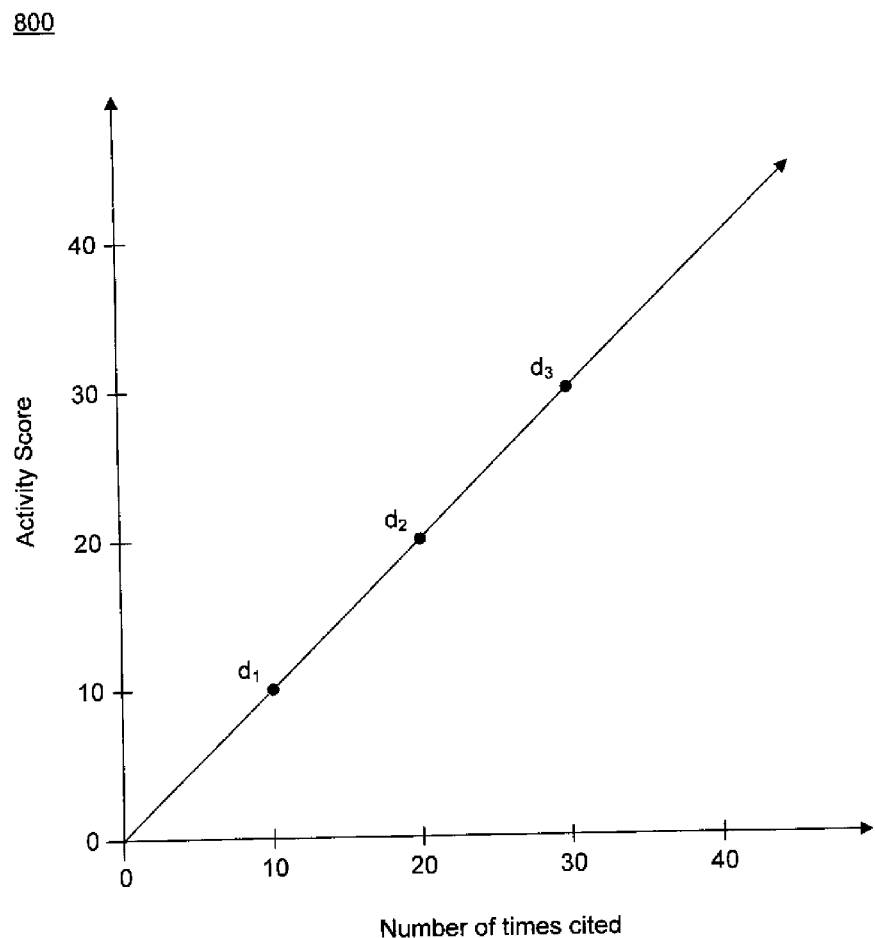
FIG. 8 shows a linear graph used to illustrate the relationship of number of case cites of a particular case to activity score in accordance with one embodiment.

FIG. 8 illustrates such an example. FIG. 8 includes linear graph 800 illustrating the relationship of number of case cites of document d (on the x-axis) to its corresponding activity score (on the y-axis). Thus, linear graph 8 illustrates one manner of calculating an individual activity score for parameter one of d's activity score. As shown, the individual activity score for parameter one of d's activity score vector equals the number of times that cases within the subject matter community cite to document d.

However, linear graph 800 provides one way to calculate the individual activity score of d for parameter one of the activity score. In particular, linear graph 800 does not take into account how often other documents in the subject matter community are cited to. For example, with respect to parameter one which represents case cites, legal document $d_1$ on graph 800 is cited by 10 cases in the legal community, and legal document $d_2$ is cited by 20 cases in the legal community. Accordingly, for documents $d_1$ and $d_2$, the difference in the individual activity score (for parameter one) is 10. Moreover, legal document $d_3$ is cited by 30 cases in the legal community. Accordingly, for documents $d_2$ and $d_3$, the difference in the individual activity score (for parameter one) is also 10.

However, the number of times that other documents are cited to in the subject matter community should also be a factor in determining activity scores for documents $d_1$-$d_3$. In this way, a number of times that other documents in the subject matter community are cited to may be used to adjust or normalize the activity score of document d. For example, if there are 5 documents in the subject matter community that are cited 10 times like $d_1$, and there are 100 documents in the subject matter community that are cited to 20 times like $d_2$, then the difference in activity score between $d_1$ and $d_2$ should be proportionately large. By contrast, if there are 110 other documents in the subject matter community that are cited to 30 times like $d_3$, then the difference in activity score between $d_2$ and $d_3$ should be proportionately small. In other words, the difference in individual activity score between $d_1$ and $d_2$ should be larger than the difference in individual activity score between $d_2$ and $d_3$ in this example. In the subject matter community, the difference between being cited 10 times and being cited 20 times is considerable, whereas the difference between being cited 20 times and being cited 30 times is not considerable. However, using the manner of calculating an activity score in FIG. 8, the activity score difference between $d_1$ and $d_2$ and between $d_2$ and $d_3$ are the same, i.e. 10.

Moreover, since parameters two to four of the activity score vector are conceptually similar to parameter one, a graph similar to linear graph 800 may not provide the optimal way to calculate the activity score for parameters two to four of d's activity score.

One way of taking into account the other documents in the subject matter community to determine parameter one of the activity score (case cites to d), is to use a probability. For example, if it is known that document d is cited 10 times in the legal community, then instead of using 10 as a basis for the activity score, the probability that d is cited 10 times may be used. Using the probability enables other documents in the subject matter community to be considered for the purposes of adjustment or normalization. That is, $$Pr(X=x) \qquad \text{[Equation 10]}$$

which is the probability that X (the number of times d is cited) equals x, which is 10 in this example. This probability distribution may not be optimal because the data set may change dynamically such that additional cases are added to the subject matter community that may cite to d. Therefore, alternatively, the probability that d is cited 10 times or more may be calculated. That is, $$\Pr(X \geq x) \quad \text{[Equation 11]}$$

which is the probability that X (the number of times d is cited) is greater than or equal to x, which is 10 in this example. Probability distributions from Equations 10 and/or 11 may be used to adjust or normalize the activity score of d with respect to the other documents in the subject matter community.

With further reference to equation 11, multiple values may be used for X (the number of times that d is cited), instead of only 10 in the previous example. When multiple values of X are used, a probability is calculated for each of the multiple values. The following table of results was generated for a particular court case in California. The table reflects the number of times that the particular court case was cited in the jurisdiction of California, as well as a corresponding probability.

TABLE 4

Sample results

| Entry | Total_cites (x) | Pr (X >= x) |
|---|---|---|
| 1 | 14179 | 0.071392 |
| 2 | 13867 | 0.075854 |
| 3 | 13279 | 0.080316 |
| 4 | 13043 | 0.084778 |
| 5 | 12790 | 0.08924 |
| 6 | 12717 | 0.093702 |
| 7 | 12672 | 0.098164 |
| 8 | 12014 | 0.102626 |
| 9 | 11242 | 0.107088 |
| 10 | 11204 | 0.11155 |
| 11 | 11149 | 0.116012 |
| 12 | 10427 | 0.120474 |
| 13 | 10055 | 0.124936 |
| 14 | 9980 | 0.129398 |
| 14 | 9730 | 0.13386 |
| 15 | 9371 | 0.138322 |
| 16 | 9211 | 0.142784 |
| 17 | 8967 | 0.147246 |
| 18 | 8961 | 0.151708 |

The first column (entry) of Table 4 serves to provide a row number for the data values, for the purposes of reference. The second column of Table 4 (total cites) illustrates multiple values of X for the particular court case. In other words, the second column of Table 4 illustrates potential values for a number of times that court cases in the jurisdiction of California cite to the particular court case. The corresponding values in column three (Pr(X>=x)), illustrate a corresponding probability for each of the values in column 1.

For example, the first data entry (entry 1) illustrates that the probability of the particular court case being cited more than 14,179 times is 0.071392 (7.1392%). Accordingly, it is relatively unlikely that the particular court case is cited more than 14,179 times in California. By contrasted, the last data entry (line 18) illustrates that the probability of the particular court case being cited more than 8,961 times is 0.151708 (15.1708%). Accordingly, it is somewhat likely that the particular court case is cited more than 8,961 times in California.

Once a set of data points (such as the ones in Table 4) is calculated according to equation 11, it becomes necessary to calculate a formula that accurately models the set of data points. Accordingly, a regression may be performed on the data set according to the following:

$$\Pr(X < x) = a \cdot x^{\alpha} \quad \text{[Equation 11.1]}$$

where x is a number of cases citing document d, and a and α are learned from a regression method. Moreover, x may correspond to the values from column 2 of table 4. For exemplary purposes only, the regression function for the data from Table 4 may be calculated to be:

$$\Pr(X < x) = 12643 x^{-1.1598}. \quad \text{[Equation 11.2]}$$

Figure 9:
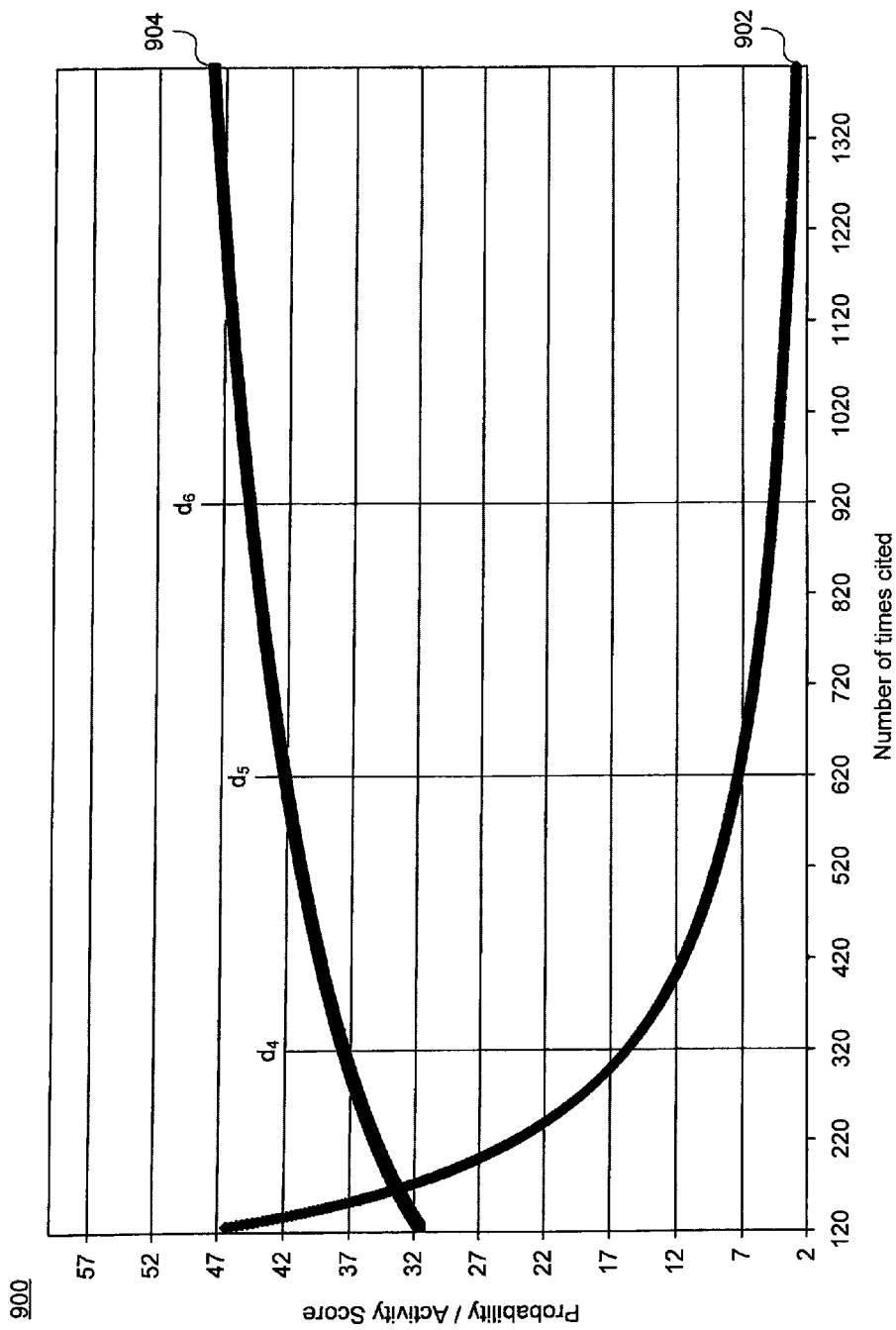
FIG. 9 shows a graph used to illustrate a probability of cases within a subject matter community are cited a variable number of times in accordance with one embodiment.

FIG. 9 shows graph 900 that illustrates a relationship between a probability of cases within a subject matter community that are cited a variable number of times and its activity score. Graph 900 includes an activity score value or a probability value on the y-axis, and a number of cases cited on the x-axis. Probability distribution curve 902 shows an exemplarily probability distribution over a set of documents in the subject matter community. Probability function 902 uses equation 11 to illustrate the probability (y) that a given document is cited greater than or equal to certain number of times (x), in the subject matter community.

In this example, probability distribution curve 902 may be based on the data points illustrated in Table 4. Moreover, probability distribution curve 902 may follow equation 11.2, which is the equation calculated (by performing a regression) to represent the data points from Table 4.

For example, for a document $d_4$ that is cited 320 times, the Pr(X≥320)=15, i.e. the probability that $d_4$ is cited more than 320 times is 15%. For a document $d_5$ that is cited 620 times, the Pr(X≥620)=7, i.e. the probability that $d_5$ is cited more than 620 times is 7%. For a document $d_6$ that is cited 920 times, the Pr(X≥920)=4, i.e. the probability that $d_6$ is cited more than 920 times is 4%. Thus, probability distribution curve 902 takes into account the frequency with which other documents in the legal community are cited to, and therefore, can be used to formulate the activity score. However, probability distribution curve 902 is downward sloping, such that the probability (y) decreases as the number of cited cases (x) increases. By contrast, the activity score should increase as the number of cased cited increases, while still taking into account other documents in the legal community.

Therefore, an activity score may be formulated as an inverse of equation 11.1. Accordingly, an equation for the activity score may be:

$$\text{Score}(x) = \frac{k}{(a \cdot x^{-\alpha} + 1)^p} \quad \text{[Equation 11.3]}$$

in which k and p are constants decided by application needs, p<1, and a and α are learned from a regression method (as was the case with equation 11.1)

In FIG. 9, activity score curve 904 illustrates an individual activity score from equation 11.3. Accordingly, while probability distribution curve 902 decreases and converges to zero as the number of times cited (x-axis) increases, the activity score curve 904 is formulated to increase and converge at a maximum value k>0 as the number of times cited (x-axis) increases. In this example, activity score curve 904 converges to a value near 50.

Moreover, for a document $d_4$ that is cited 320 times, the individual activity score is 37. For a document $d_5$ that is cited 620 times, the individual activity score is 42. For a document $d_6$ that is cited 920 times, the individual activity score is 45. In this example, the individual activity scores increase to reflect the importance of additional citations, yet increase at a diminishing rate to reflect the decreased likelihood of documents being cited to a larger and larger number of times.

FIGS. 8 and 9 are illustrative of parameter one of the activity score (case cites). Similar concepts, including equations 11.1 and 11.3, may be used to calculate parameters two through four (U.S. Supreme Court cites, law review articles, and treatises). As discussed, individual activity scores for parameters one though four may be added to individual activity scores for parameters five and six (signal and treatment), to calculate a total activity score for a document d.

Accordingly, the total activity score for d may be represented as, $$ActivityScore(d) = \qquad \text{[Equation 12]}$$
$$W(\text{age}) \sum_{i=1}^{4} w_i Score(x_i) + Score(x_5) + Score(x_6)$$

where $w_i$ is the weight or score distribution and $x_i$ is the total number of citing references for activity score vector dimension i. For example, i=1 corresponds to the first dimension in the activity score vector, which is citing cases. Moreover, i=2 corresponds to the second factor in the activity score vector, which is U.S. Supreme Court Cases, and so forth.

The first term in Equation 12, W(age) may increase the activity score of legal documents that are younger or more recent. For example, a 30 year old legal document which is cited to 5 times receives a lower activity score than a 1 year old legal document which is also cited to 5 times. The factor W(age) may be calculated according to the following:

$$W(\text{age}) = \frac{k}{\frac{\log_2(\text{age})}{m} + 1} \qquad \text{[Equation 13]}$$

where k and m are constants which may be dynamically decided based on application needs. In this way, younger cases may be promoted to have higher activity scores.

The next term in Equation 12 (the summation), adds individual activity scores for each of dimensions one through four in the activity score vector. The individual activity score for each of dimensions one through four may use an inverse of a probability distribution to take into account the frequency with which other documents in the legal community are cited to, such as exemplified in FIG. 9.

The next term in Equation 12 is an activity score of a signal associated with d (corresponding to dimension five of the activity score vector). This activity score may be decided semantically by application needs.

The next term in Equation 12 is activity score of a treatment associated with d (corresponding to dimension six of the activity score vector). The activity score of the treatment may be defined according to a number of positive and/or negative treatments of d. The activity score of the treatment may be calculated according to the following, $$Score(x_6) = \frac{k}{(a(x+1)^{-\alpha} * 100 + 1)^p} \qquad \text{[Equation 14]}$$

where, $$x = \frac{(P-N)^2}{P+N} \qquad \text{[Equation 15]}$$

where k is positive when P>N, and k is negative when P<N, and k=0 when P=N. Moreover, variables a, α, and p may be learned from a regression method (as was the case with equation 11.1).

As set forth above, the terms in Equation 12 have been described. These terms may be used in calculating a total activity score for d. The total activity score for d may be used to weight a meta rank score for d. Alternatively, the total activity score of d may independent from the meta rank score of d, and may be displayed separately.

Figure 10:
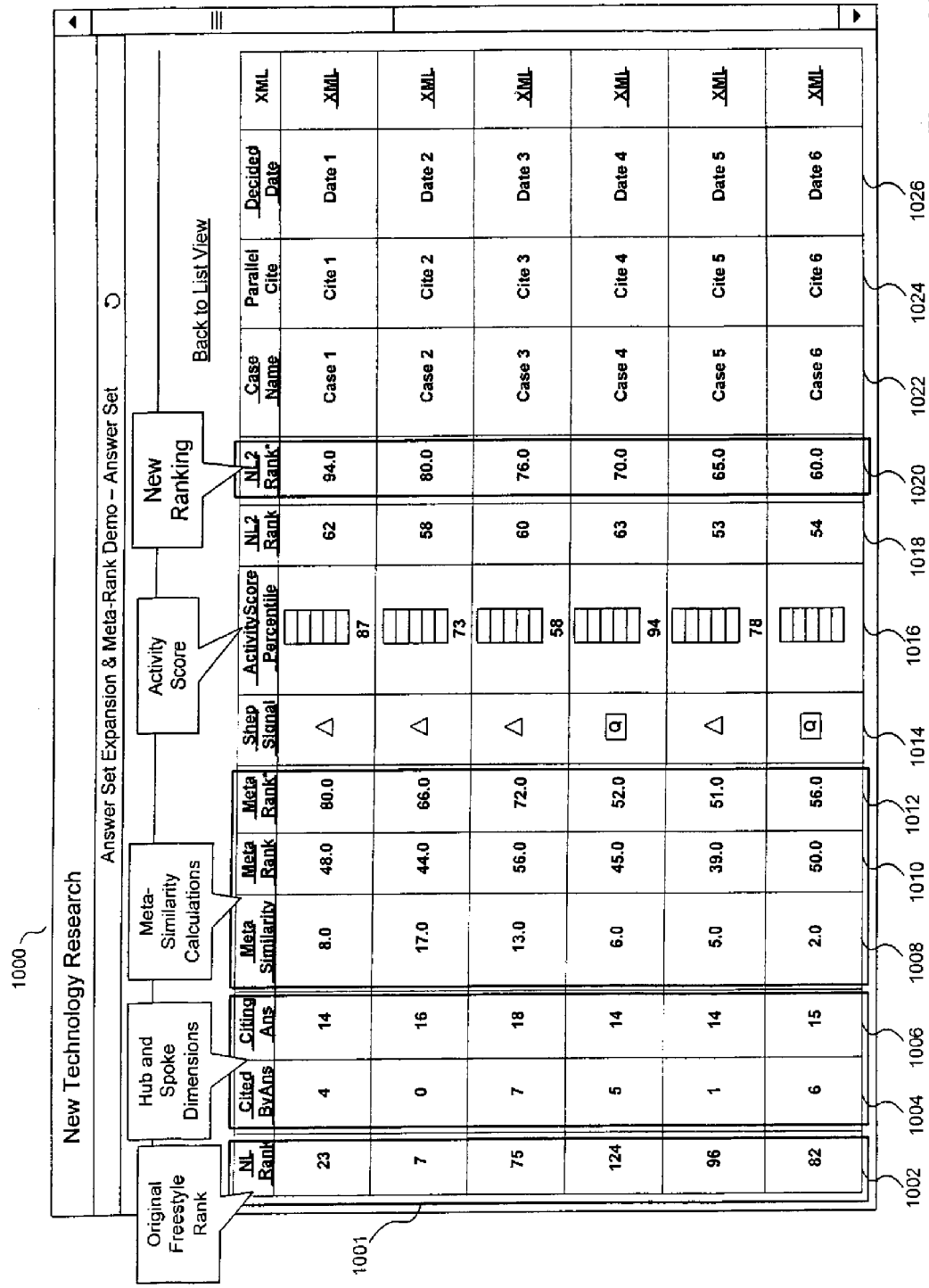
FIG. 10 includes an exemplary results page generated in response to a query of a legal database in accordance with one embodiment.

FIG. 10 illustrates an exemplary results page 1000, which may be generated in response to a query of a legal database, such as database 114, in accordance with disclosed embodiments. Results page 1000 includes a ranked list of documents, as well as corresponding data about the ranking for each document. Each row is an entry and each entry corresponds to a document. For example, entry 1001 corresponds to a stored document determined to be responsive to a query. The same is true for the remaining entries in page 1000. The order of ranking in results page 1000 may be determined according to an IRScore, meta rank score, and/or activity score, among other factors, for each document. Moreover, results page 1000 may include a series of columns 1002-1026 that describe the ranked list of documents.

Column 1002 may include an original rank for each displayed document, before the IR Score, meta rank score, and/or activity score may be used to rank the displayed documents. For example, the original rank corresponding to entry 1001, shown in column 1002, is "7." Accordingly, column 1002 may be used to illustrate a change in ranking between prior ranking systems and systems consistent with disclosed embodiments.

Column 1004 may include a number of documents within a baseline set that are cited to by each displayed document (out-cites). For example, the number of documents that are cited to by the document corresponding to entry 1001, as shown in column 1004, is "0." Moreover, column 1006 may include a number of documents within the baseline set that cite each displayed document (in-cites). For example, the number of documents that cite to by the document corresponding to entry 1001, as shown in column 1006, is "16." Out-cites and in-cites were previously discussed with respect to FIGS. 5 and 6.

Column 1008 may include an IR Score, which illustrates a similarity between metadata of the displayed documents and the query. For example, the IR score corresponding to entry 1001, as shown in column 1008, is "17.0." IR Score from column 1008 may be calculated according to Equation 3 (which incorporates Equations 1 and 2). Column 1010 may include a first meta rank score for each displayed document calculated according to in-cites, out-cites, and the IR Score. For example, the first meta rank score corresponding to entry 1001, as shown in column 1010, is "44.0." First meta rank score from column 1010 may be calculated according to a combination of equations 4 and 7 (e.g., by adding the results of Equations 4 and 7).

Moreover, column 1012 may include a second meta rank score for each displayed legal document, also calculated according to in-cites, out-cites, and the IR Score. For example, the second meta rank score corresponding to entry 1001, as shown in column 1012, is "66.0." Second meta rank score from column 1012 may be calculated according to a combination of equations 5 (which incorporates Equation 6) and 8 (which incorporates Equation 9). For example, the results of Equations 5 and 8 may be added to arrive at the second meta rank score.

First meta rank score and second meta rank score may both correspond to a meta rank score. First meta rank score and second meta rank score may each be the result of different methods by which to calculate a meta rank score according to an IR Score, in-cite, and/or out-cites.

Column 1014 may include a signal (e.g. a Shepard's® signal) for each of the displayed documents. For example, the signal corresponding to entry 1001, as shown in column 1014, is an upward arrow signifying positive treatment. Column 1016 may include an activity score for each of the displayed legal documents. For example, the activity score corresponding to entry 1001, as shown in column 1016, is "73." The activity score from column 1014 may be calculated according to equation 12, which incorporates equations 13-15.

Column 1018 may include a first new ranking by combining the first meta rank score with the activity score. For example, the first new ranking corresponding to entry 1001, as shown in column 1018, is "58." Column 1020 may include a second new ranking by combining the second meta rank score with the activity score. For example, the second new ranking corresponding to entry 1001, as shown in column 1020, is "80." First new ranking and second new ranking may be the results of different methods to rank the displayed legal documents using the IR Score, meta rank score, and/or activity score.

Column 1022 may include case names or other identifiers for the displayed documents. For example, the case name corresponding to entry 1001, as shown in column 1022, is "Case 2." Column 1024 may include citations for each of the displayed documents. For example, the citation corresponding to entry 1001, as shown in column 1024, is "Cite 2." Column 1026 may include a date associated with each of the displayed documents, for example, a date decided. For example, the date corresponding to entry 1001, as shown in column 1026, is "Date 2."

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

Other embodiments will be apparent to those skilled in the art from consideration of the specification and practice of the embodiments disclosed herein. It is intended that the specification and examples be considered as exemplary only, with a true scope and spirit being indicated by the following claims.

What is claimed is:

1. A computerized method for calculating a normalized activity score value to rank an identified document, the method comprising:
    identifying a stored document;
    determining a number of times the identified document was cited in a subject matter community of the identified document;
    determining a probability distribution that individual documents within the subject matter community are cited a variable number of times by other individual documents in the subject matter community;
    calculating a probability function by performing a regression on the probability distribution;
    calculating the activity score value according to an activity score function formulated as an inverse of the probability function such that the activity score function is defined by:

$$\text{Score}(x) = \frac{k}{(a \cdot x^\alpha + 1)^p},$$

wherein:
    Score(x) is the activity score value, k and p are constants, x is the number of documents citing the identified document, and a and $\alpha$ are learned from the regression on the probability distribution; and the activity score function is such that the activity score value is calculated according to a probability that the individual document in the subject matter community is cited a number of times greater than or equal to the number of times the identified document was cited in the subject matter community;
    weighting the activity score value by an age of the identified document; and
    storing in computer memory a ranking of the identified document based on the activity score value.

2. The method of claim 1, wherein the subject matter community comprises a jurisdiction of a legal community.

3. The method of claim 1, wherein the calculating the activity score further comprises:
    generating an activity score vector;
    calculating an individual activity score value for dimensions of the activity score vector, wherein at least one of the dimensions is associated with the number of times the identified document was cited in a subject matter community of the identified document;

weighing at least one of the individual activity score values by an age of the identified document; and adding the individual activity score values to obtain a total activity score value.

4. The method of claim 3, wherein the dimensions of the activity score vector comprise at least one of U.S. Supreme Court cites, law review articles, treatises, signal, or treatment in addition to the dimension associated with the number of times the identified document was cited in a subject matter community of the identified document.

5. The method of claim 1, wherein the activity score value of the identified document is normalized in relation to other documents in the subject matter community.

6. A non-transitory computer-readable medium comprising program instructions, which, when executed by a processor, cause the processor to perform a method for calculating a normalized activity score to rank an identified document, the method comprising:

identifying a stored document;

determining a number of times the identified document was cited in a subject matter community of the identified document;

determining a probability distribution that individual documents within the subject matter community are cited a variable number of times by other individual documents in the subject matter community;

calculating a probability function by performing a regression on the probability distribution;

calculating the activity score value according to an activity score function formulated as an inverse of the probability function such that the activity score function is defined by:

$$\text{Score}(x) = \frac{k}{(a \cdot x^\alpha + 1)^p},$$

wherein:

Score(x) is the activity score value, k and p are constants, x is the number of documents citing the identified document, and a and α are learned from the regression on the probability distribution; and the activity score function is such that the activity score value is calculated according to a probability that the individual document in the subject matter community is cited a number of times greater than or equal to the number of times the identified document was cited in the subject matter community;

weighing the activity score value by an age of the identified document; and storing in computer memory a ranking of the identified document based on the activity score value.

7. The non-transitory computer-readable medium of claim 6, wherein the subject matter community comprises a jurisdiction of a legal community.

8. The non-transitory computer-readable medium of claim 6, wherein the calculating the activity score further comprises:

generating an activity score vector;

calculating an individual activity score value for dimensions of the activity score vector, wherein at least one of the dimensions is associated with the number of times the identified document was cited in a subject matter community of the identified document;

weighing at least one of the individual activity score values by an age of the identified document; and adding the individual activity score values to obtain a total activity score value.

9. The non-transitory computer-readable medium of claim 8, wherein the dimensions of the activity score vector comprise at least one of U.S. Supreme Court cites, law review articles, treatises, signal, or treatment in addition to the dimension associated with the number of times the identified document was cited in a subject matter community of the identified document.

10. The non-transitory computer-readable medium of claim 6, wherein the activity score value of the identified document is normalized in relation to other documents in the subject matter community.

* * * * *

UNITED STATES PATENT AND TRADEMARK OFFICE
CERTIFICATE OF CORRECTION

PATENT NO. : 8,886,638 B2  Page 1 of 1
APPLICATION NO. : 13/403253
DATED : November 11, 2014
INVENTOR(S) : Ling Qin Zhang et al.

It is certified that error appears in the above-identified patent and that said Letters Patent is hereby corrected as shown below:

In the Claims

Claim 1, column 20, lines 40-45, change "$Score(x) = \frac{k}{(a \cdot x^{\alpha}+1)^{p}}$" to "$Score(x) = \frac{k}{(a \cdot x^{-\alpha}+1)^{p}}$"

Claim 6, column 21, lines 36-40, change "$Score(x) = \frac{k}{(a \cdot x^{\alpha}+1)^{p}}$" to "$Score(x) = \frac{k}{(a \cdot x^{-\alpha}+1)^{p}}$"

Signed and Sealed this
Third Day of March, 2015

Michelle K. Lee
*Deputy Director of the United States Patent and Trademark Office*